United States Patent [19]

Hellnick et al.

[11] Patent Number: 4,708,038
[45] Date of Patent: Nov. 24, 1987

[54] METHOD FOR MACHINING AND IMPROVED MODIFIED THREADED COLLAR

[76] Inventors: Dieter Hellnick, 8204 Fairbanks N. Houston, Houston, Tex. 77064; Karl J. Victor, 3660 Lake Aspen East Dr., Gretna, La. 70056; Gregory K. Otten, One Shell Plaza, P.O. Box 2463, Houston, Tex. 77001

[21] Appl. No.: 901,626

[22] Filed: Aug. 29, 1986

[51] Int. Cl.$^4$ .............. B23C 1/00; B23G 1/22; B65D 59/00; F16L 57/00
[52] U.S. Cl. .................... 82/1 C; 82/5; 285/333; 285/334; 285/355; 285/369; 403/296; 403/343
[58] Field of Search .............. 82/1 C, 5; 285/333, 285/334, 355, 369; 403/296, 343

[56] References Cited

U.S. PATENT DOCUMENTS

| 126,553 | 5/1872 | Kellam | 285/355 |
|---|---|---|---|
| 1,993,257 | 3/1935 | Bettis | 403/343 |
| 2,980,451 | 4/1961 | Taylor et al. | 285/333 |
| 4,431,219 | 2/1984 | Brewer et al. | 285/369 |
| 4,432,394 | 2/1984 | Martin | 285/333 |
| 4,617,537 | 10/1986 | Axford et al. | 82/1 C |

Primary Examiner—Nicholas P. Godici
Assistant Examiner—Jerry Kearns
Attorney, Agent, or Firm—Mark G. Bocchetti

[57] ABSTRACT

Disclosed is a method directed particularly to improving a modified threaded buttress collar. The method is also of value with any internally threaded member having a seal ring groove therein. The method specifically deals with the removal of the feather edge thread created when a seal ring groove is placed within an internally threaded member. Such groove usually provides residence for a seal ring. When the groove is placed in the internally threaded member there is created a feather edge thread immediately adjacent the groove. This feather edge thread is easily deformable and can create severe galling problems within the coupling.

The feather edge is removed, preferably, in stepped fashion utilizing a machining tool such as a grooving tool within a computer numerically controlled lathe. The grooving tool is set such that as the coupling turns in the lathe, the movement of the grooving tool matches the pitch and helix of the threads and the speed of the lathe. However, the grooving tool is offset such that it is placed on a collision course with the thread. The groove allows some running time for the grooving tool to be properly positioned for the specific thread pitch and helix. The feather edge is removed in several passes, each being deeper than the last until, ultimately, the feather edge is removed to a depth equal to the depth of the finished threads.

9 Claims, 5 Drawing Figures

METHOD FOR MACHINING AND IMPROVED MODIFIED THREADED COLLAR

BACKGROUND OF THE INVENTION

1. Field of the Invention

This invention relates generally to internally threaded members such as threaded buttress collars and more particularly, to a method for removing feather edge threads from internally threaded and grooved members.

2. Brief Description of the Prior Art

There is in the prior that which is typically referred to as the API buttress collar. API buttress collars are often modified such that spaced from each face of the collar, there is machined or cut within the buttress collar an annular groove which provides residence for a seal ring. When such seal ring grooves are cut into a threaded collar, there are created feather edge threads immediately adjacent the seal ring groove. These feather edge threads at their beginning points are literally thinner than ordinary paper and are therefore easily deformable. The feather edge threads may be deflected by the jarring contact between the threads of the male and female members when they are being screwed together, or they may be deflected merely by the manual insertion of the seal rings within the grooves. The feather edge threads may also be be deflected by the pressure of the seal ring when the male member is screwed into the coupling. As the seal ring is engaged by the threads of the male member it is caused to flow about the threads of the male member. Assuming proper selection of seal ring design, the volume of the seal ring is greater than the volume of the groove minus the volume of the threads of the male member residing in the seal ring groove. In other words, proper selection of seal ring design will create a slight overfill condition. The net result is that the seal ring flows against and places pressure upon the feather edge thread adjacent the seal ring groove. This pressure is significant and easily deflects the feather edge thread into the path of the threads of the male member. The resulting collision between the feather edge thread and the threads of the male member creates a galling problem from that point on within the coupling. This galling problem can cause two distinct effects. Galling can decrease the leak resistance of the connection between the male and female members. Galling can also decrease the tensional loading capacity of the connection.

There is in the prior art a variety of improved coupling and threaded pipe joint connections having groove and seal rings therein. However, none of these prior art teachings deal with the problem created by the feather edge thread nor do they teach any method for removing the feather edge thread to alleviate the problem.

For example, U.S. Pat. No. 2,150,221 to Hinderliter teaches a rotary tool joint having dual seal retaining grooves. Such grooves are machined into the coupling at substantially the starting and ending points of the threads. However, Hinderliter does not recognize the problem created by machining a groove in an internally threaded member thereby creating a feather edge thread and therefore offers no solution to such problem.

Similarly, U.S. Pat. No. 2,980,451 to Taylor et al teaches a threaded pipe joint having an extrudable sealing means residing within a seal ring groove. As such, Taylor et al teaches nothing more then what can be seen from the typical modified API threaded buttress collar previously mentioned. It is not directed to the problem created by placing a seal ring groove within an internally threaded member and teaches nothing with regard to the solution of such problem.

U.S. Pat. No. 4,431,219 to Brewer et al teaches a replaceable tubular connector. Such replaceable tubular connector has machined therein what is referred to as an annular groove in which mounts a deformable seal ring. Brewer et al does not address the problem created by machining an annular groove within an internally threaded member to create an easily deformable feather edge thread and therefore, offers no solution to such problem.

While there is a feather edge thread on each side of each seal ring groove, it is that feather edge thread furthest from the face of the collar which is the source of the galling problem. Methods and operations to remove the deflectable portion of such feather edge threads are heretofore unknown.

SUMMARY OF THE INVENTION

It is therefore an object of the present invention to provide a method for removing the deformable portion of the feather edge thread within an internally threaded and grooved member.

It is a further object of the present invention to provide a method which alleviates the potential for galling caused by the deformation of a feather edge thread within a threaded member.

Briefly stated, the foregoing and numerous other objects and advantages of the present invention are accomplished by performing a higbee type modification to remove the feather edge thread from an internally threaded member.

Grooves are often made in internally threaded members such as couplings or collars to provide residence for an annular seal. When such a groove is placed within an internally threaded member, there is created at the edge of such groove a feather edge thread. By definition, a feather edge thread would be that portion of the thread which does not have full thread width and tapers down to literally nothing at its starting point immediately adjacent the groove. Such a feather edge thread is easily deformable by a variety of means. It may be deformed merely by the manual insertion of the seal ring within the groove. Deformation of the feather edge may also occur when the male threaded member is initially screwed into the grooved collar. Buttress threads have an inherent amount of play until the two members are fully made up. This play allows the male and female members to move relative to one another even though they have already been partially screwed together. Such movement can jar the feather edge thread causing it to deform. Deformation can further occur when the male member is screwed into the collar resulting in pressure being placed upon the seal ring which resides in the groove within the collar. This pressure causes the seal ring to deform and as it does, it may flow toward the feather edge thread. This results in the seal ring placing pressure on the feather edge and the feather edge thread will deform.

The present invention is basically a computer assisted method of machining an integrally threaded and grooved member whereby the feather edge thread on the initial coupling manufactured is located in relation to the location of the initial cut made attempting to remove the feather edge thread. An adjustment is made to the threading command portion of the program such that on couplings machined thereafter, the location of the feather edge thread will have been moved to the location where the feather edge thread removal cut is being made. The method requires some trial and error with regard to the first coupling manufactured and, therefore, it is the usual case that the first coupling manufactured must be scrapped.

The overall process requires that a coupling blank be faced and then bored to the desired inside diameter. Following this, the coupling is rough threaded and the groove is machined therein. The feather edge is then removed. This is followed by a finished thread pass. The feather edge may be removed wtih the grooving tool or a threading tool or a buttress tool or even a miling attachment.

It should be recognized that the groove serves to provide residence for a seal ring which aids in sealing the connection between the male and female members. It is therefore apparent that the location of the groove must be within the sealing threads of the female member.

It has been determined empirically that a thread thickness of 0.033 inches plus or minus 0.010 inches is sufficient to resist any deforming force which may be caused by the flow of the teflon ring which is the primary source for deforming the feather edge thread. It has also been determined that for a thread pitch of 0.2, it will be necessary to remove the feather edge from the point of its beginning immediately adjacent the groove along an arc length of approximately 1/6th of the total circumference to achieve an acceptable, initial thread thickness of at least 0.033 inches plus or minus 0.010 inches.

Depending primarily upon coupling diameter and machine speed, the grooving type tool used to remove the feather edge is commanded to "get out" as quickly as possible. In other words, the grooving type tool is commanded to move toward the cylindrical axis of the coupling such that it no longer engages any portion of the coupling. As the tool elevates away from the thread, it creates a sloping or concave shoulder on the thread which, necessarily, rises to full thread height. This sloping shoulder is a desirable feature as opposed to a square or abruptly beginning thread.

After the rough threading and grooving of the initial coupling is performed, the command is given to remove the feather edge thread. It is likely that, upon inspection of the initial coupling, it will be found that that portion of the thread removed was not the feather edge thread. The difference in location between that portion of the thread removed and the feather edge must be noted. The threading tool is then adjusted in the Z direction (along the cylindrical axis of the coupling) so that the feather edge thread will be located at the point where thread removal was accomplished. In this manner, the command of the grooving type tool used to remove the feather edge thread is left fixed and will remove a thread portion at exactly the same spot for each coupling thereafter machined. By adjusting the threading tool, the feather edge on all couplings thereafter machined will be located where the grooving-type tool makes its feather edge removal pass.

DESCRIPTION OF THE PREFERRED EMBODIMENT

Figure 1:
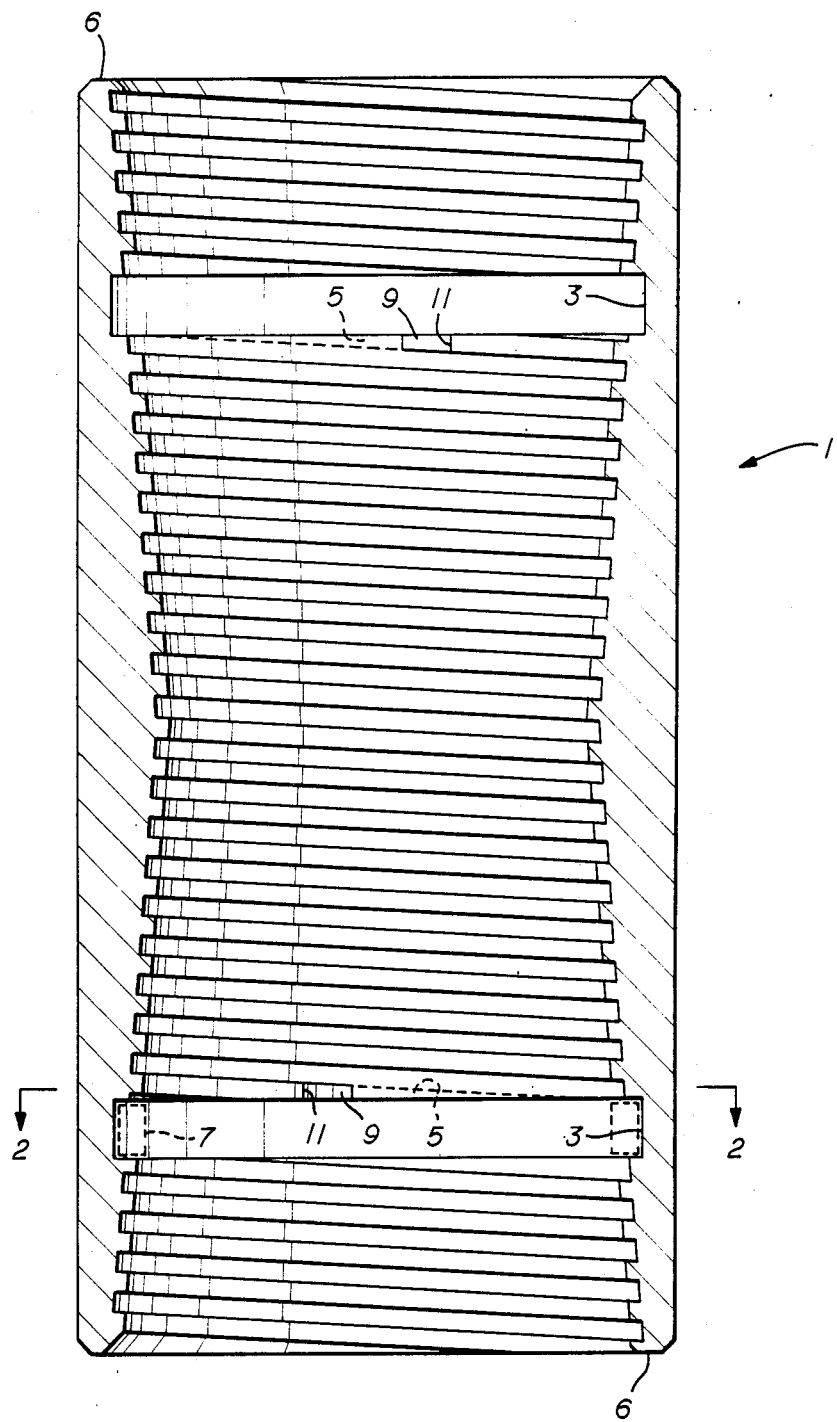
FIG. 1 is a cross sectional view of threaded and grooved coupling perpendicular to the cylindrical axis of the coupling.
Figure 2:
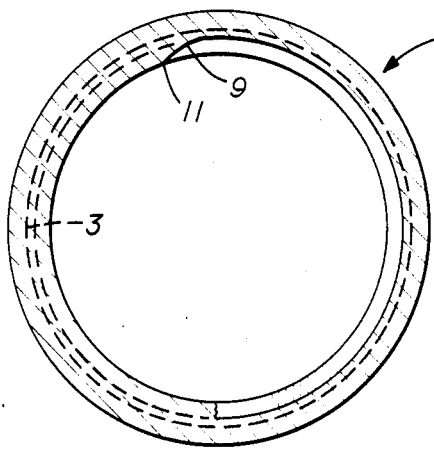
FIG. 2 is a partial section view parallel to the cylindrical axis of coupling along line 2—2.
Figure 3:
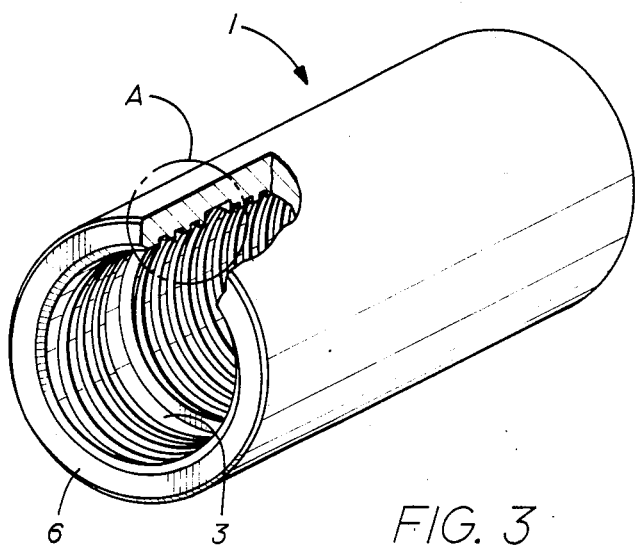
FIG. 3 is a cut away perspective view of an API buttress collar having a seal ring groove machined therein.

Turning first to FIG. 1, there is shown a section view of an API buttress collar 1 with a seal ring groove 3 cut therein. The machining of the groove 3 in the threaded coupling 1 creates a feather edge thread 5 immediately adjacent the seal ring groove 3. It is the feather edge thread 5 which must be removed in order to prevent the galling problems which have been encountered with grooved threaded couplings in the past.

Figure 4:
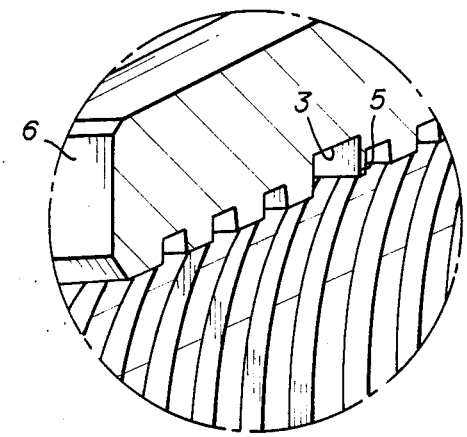
FIG. 4 is an enlarged view of that portion of FIG. 3 within Circle A before the feather edge thread is removed.
Figure 5:
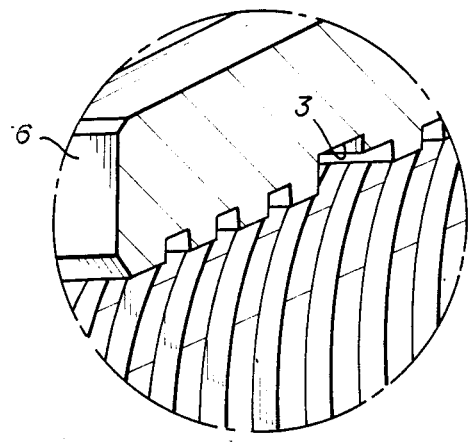
FIG. 5 is an enlarged view of that portion of FIG. 3 within Circle A after the feather edge thread is removed.

Actually, a feather edge thread is created on each side of groove 3. It is the removal of the feather edge thread 5 furthest from the face 6 of the collar 1 to which the present invention is directed. This is most clearly depicted in FIG. 4 and FIG. 5 which show the groove 3 before and after removal of the feather edge thread 5.

It is preferable to remove only that portion of the feather edge thread 5 which is readily deformable under the pressure exerted by the flow of the teflon seal ring 7 when a male member is threaded into the coupling 1. It has been empirically determined that a thread thickness of 0.033 inches plus or minus 0.010 inches is sufficient to resist the deforming force caused by the flow of the teflon seal ring 7. It has further been determined that for a thread pitch of 0.2, it is necessary to remove the feather edge thread from the point of its beginning immediately adjacent the groove 5 along an arc length of approximately 1/6th the total circumference of the coupling 1. Removal of this amount of feather edge thread 5 will achieve an initial thread thickness of at least 0.033 inches plus or minus 0.010 inches.

To practice the method of the present invention, it is first necessary to mark a coupling blank with a single line running parallel to the cylindrical axis of the blank along the length of the blank. This line is used to properly orient the blank in the chuck of the computer numerically controlled lathe to insure a good cross over pattern when machining the second side of the blank. In other words, the coupling must be properly oriented in order to achieve a single constant thread pattern all the way through the coupling. The coupling blank is placed into the chuck of the computer numerically controlled lathe making certain that the blank is pushed completely back to the mechanical stop on the chuck jaws. The orientation of the cross over line must be duly noted so that the blank can be properly positioned when it is flipped over for second side operation.

At this point, the computer numerically controlled lathe can be started allowing the machine to begin its preprogrammed movements. The initial program command calls up the facig tool of the lathe to face the blank and machine the outside diameter chamfer. The length of the blank after this first facing operation should be the finished length of the coupling plus 0.100 inches. This excess 0.100 inches will be removed when the second side of the blank is faced during second side operation. At this point, we are only dealing with first side operation.

The program next commands the boring tool to roughly machine the inside diameter chamfer and make a short gage pass to machine the desired inside diameter. The machine then, preferably, automatically shuts down allowing the operator to check the diameter of the gage pass in order to determine if an adjustment is needed to insure the proper rough bore diameter. If adjustments are needed the operator makes the adjustments and operation of the preprogrammed machine movements is continued. The inside diameter chamfer is finished and the inside diameter bore is roughed in one inch past the center of the blank in order to create a clearance for the thread chaser when the theading portion of the operation is performed.

The lathe then goes into threading mode automatically adjusting the machine to the desired speed. The machine picks up a 0.200 inches per revolution lead assuming a thread pitch 0.200 and proceeds with all but the final threading pass. In other words, if the finished threading is to be accomplished in a total of five passes with the threading tool, then the machine will complete the initial four passes. However, the operator must first set the threading tool a set distance, for example, one inch from the face of the coupling. This series of threading passes leaves just enough stock on the top of the threads to allow for a fifth deburring pass which clears the thread path and finishes the makup standoff.

Before any operation is begun, the program automatically adds or subtracts the offset value for that particular tool of that particular machine. Offsets are primarily used to adjust the machine for machine wear, tool wear, machine errors, and/or differences between machines and tooling. Offsets are typically referred to as being along the X and Z axes.

At this point, the groove 3 can be machined into the coupling 1. Prior to proceeding with the grooving operation, however, the operator checks the offset values for both the grooving operation and the feather edge thread removal operation. The operator must determine that these offsets are equivalent because in the preferred embodiment, both operations will be performed with the same tool. This insures that the feather edge removal operation will not result in a tooling crash or failure. The command is then given to begin the feather edge thread removal operation.

In the preferred embodiment, assuming a thread pitch of 0.200, a 0.094 inch wide grooving tool is used to make two plunge cuts, finishing the back side of the groove first and fiishing the width of the groove with the second plunge. The tool then makes a lateral movement to clean up the bottom of the groove and retracts to normal tool position.

The next step is the removal of the feather edge thread which, as stated earlier, is performed, in the preferred embodiment, with the grooving tool. The groove itself provides some running time for the grooving tool to achieve a 0.200 inches per revolution lead. It is preferable to remove the feather edge in a series of passes, each pass cutting to a greater depth then the last and the final pass cutting to the finished thread depth. Each pass will begin at precisely the same point and proceed for an arc length of 1/6 of the inside circumference of the coupling 1. As each pass is completed, the grooving tool is commanded to retract and as the grooving tool pulls out, a sloped or concave shoulder 9 is created in the remaining thread. This sloped or concave shoulder 9 is a desirable feature providing substantial benefits over having an abruptly beginning thread which would present a substantially perpendicular initial face against which the male type member threads could ram when the male member is screwed into the coupling 1. The length of the sloped or concave shoulder 9 can be controlled by adjusting the machine speed or the pull out rate of the grooving tool. With a high machine speed and a relatively small diameter coupling, the command is simply "to get out as quickly as possible". In the preferred embodimet, the feather edge thread removal operation is completed with a series of 14 passes by the grooving tool.

After completion of the feather edge thread removal operation, the machine automatically proceeds with the final threading pass and finishes the make-up standoff. The machine then stops and the first side of the coupling 1 is complete.

Imperative to the method of the present invention is a complete inspection of the first side of the coupling 1 and the making of adjustments if it is determined that such adjustments are necessary. It is quite likely that adjustments will be necessary on the initial coupling 1 being machined. The coupling 1 should be inspected for variance of the following dimensions:

(a) coupling length;
(b) outside diameter chamfer;
(c) inside diameter bore;
(d) inside diameter chamfer length;
(e) make-up standoff;
(f) groove diameter; and
(g) groove location.

It is important to realize that the make-up standoff, groove diameter and groove location must all be correct before an evaluation or adjustment of the feather edge removal operation can be made. Since this is rarely the case on the first coupling being machined, it is the usual case that no adjustment is made to the feather edge removal operation until the second side of the coupling 1 is machined and inspected. If such dimensions are not correct, then adjustments made to correct these dimensions would necessarily move the location of the feather edge thread making evaluation, at this point, useless.

After the adjustments are made to correct any errors in the above-mentioned seven critical dimensions, the coupling 1 is flipped over and again placed in the chuck of the lathe to begin second side operation. When the coupling is replaced in the chuck, special attention must be paid to orient the line originally drawn on the coupling such that it is positioned exactly as it was during first side operation.

The computer numerically controlled lathe then represents the machining operations previously described for side 1. When side 2 is complete, the coupling 1 must be again thoroughly inspected. The make-up standoff, groove diameter and groove location for the second side should all be correct. This allows for an evaluation and gross adjustment on the feather edge thread removal operation. If the make-up standoff, groove location and groove diameter are not correct, then another side must be machined before evaluation or gross adjustment of the feather edge removal operation can be made.

Evaluation of the feather edge thread removal operation requires the location of two points within the coupling. They are the actual pull out point 11 of the grooving tool at the end of the feather edge thread removal operation and the desired pull out point of the grooving tool at the completion of the feather edge thread removal operation. Once these two points have been located, it is necessary to determine the angle relationship between the two points. This determination may be in the form of an educated guess. By way of example, if the actual pull out point and the desired pull out point were directly across from one another within the coupling, then the angle relationship would be 180°. A gross adjustment would be necessary to the distance at which the threading tool is initially set from the face of the coupling in an attempt to reduce the angle relationship to zero. For 180°, which equals one-half of a revolution, and a thread pitch of 0.200, the adjustment would be 0.100 inches.

It must also be decided whether the actual pull out point is before or after the desired pull out point keeping in mind the direction of rotation of the spindle during machining. The adjustment to the initial distance between the threading tool and the face of the coupling is an adjustment along the Z axis. Whether actual pull out occurs before or after desired pull out determines whether such adjustment is positive or negative.

If the angle difference between the actual and desired pull out points is less than 60°, then the width of the cut made by the feather edge removal operation can be accurately measured. Measurement of the width of such cut allows the operator to make a fine adjustment of the threading tool offset in the Z direction. By way of example, if the angle between the actual and desired pull out points is less than 60° and the width of the cut made by the feather edge removal operation is measured to be 0.020 inches at the last sign of the grooving tool cut where tool pull out occurs, then the operator would adjust the threading tool offset 0.013 inches in the Z direction toward the chuck of the lathe. This will make the feather edge thread cut 0.013 inches wider on the next coupling or side machined. If the feather edge thread removal cut is too wide, then the operator must adjust the thread machining offset in the Z direction away from the chuck, of the lathe thereby making the feather edge thread cut on the next piece of side narrower. For the feather edge cut to be too wide, however, it would have to intrude into the next thread. It should be recognized that if the grooving tool is used to remove the feather edge thread, the grooving tool is much wider than the desired width of the cut for the feather edge removal operation. Therefore, the grooving tool must necessariy partially overhang the groove during this operation. Because the pull out point is what actually determines the starting width of the remaining thread, the grooving tool may also slightly overhang the feather edge on the side opposite the groove so long as it does not overhang so far as to remove metal from the next thread.

Once the width of the feather edge removal operation is correct, an adjustment should be made to the offset of the grooving tool in the X direction to insure that the feather edge removing tool rides just above the root of the threads. This creates a smooth transition when the feather edge removal tool is pulled out. If the depth of the cut of the feather edge thread removal operation is not correct, the result is either a damaged thread root or a narrow ridge immediately adjacent the groove 3.

It should be recognized that the feather edge removal operation is performed in exactly the same spot on each operation and the adjustments being made to the threading tool offset are merely to move the feather edge thread to where the feather edge thread removal operation is being performed. Once the feather edge thread removal operation width is properly adjusted, there remains only one step to complete the method of the present invention. An adjustment is required to insure a good cross over from one side of the coupling to the other. As explained earlier, it is desirable to have one contiuous thread pattern all the way through the coupling. This adjustment can be made by rotating the starting position of the cross over line marked on the outside of the coupling either clockwise or counter clockwise with respect to the chuck of the lathe.

If the angle or difference between the desired and actual pull out points of the feather edge removal operation is more than 60°, then a more drastic adjustment is necessary because under such circumstances, it is usually the case that the width of the feather edge removal operation at the actual pull out point cannot be physically measured. When this occurs, it is necessary to approximate the actual angle and determine if the actual pull out occurred before or after the desired pull out. With this information, an initial offset adjustment can be determined with the following formula: offset=(angle of difference/360°×thread pitch) using this formula, an offset adjustment can be made to the feather edge removal operation which will cause the actual pull out point of the next feather edge removal operation to occur close enough to the desired location to allow accurate physical measurement of the width of the cut made during the operation.

For example, if the angle of difference is believed to be 90° between the actual and desired pull out locations and the actual pull out occurs after the desired pull out, the formula tells the operator to make an adjustment of 0.050 inches to the offset of the threading tool operation in the Z direction away from the chuck assuming the thread pitch is 0.200 inches. If the angle of difference is believed to be 120° and the actual pull out occurs before the desired pull out, the offset adjustment required by the formula is 0.066 inches in the Z direction toward the chuck of the lathe again, assuming a thread pitch of 0.200.

Using the formula will likely not make the feather edge removal operation exactly correct. However, it will place the location of the actual pull out close enough to the desired pull out to allow a much more accurate adjustment to be made on the next piece.

Once all of the offset adjustments are made and the orientation of the single line on the outside of the blank are determined, no further trial and error is required. Each piece manufactured from that point on will be identical to the last side machined and therefore, will be correct. The net result will be the machining of couplings from blanks which are threaded and grooved with the feather edge thread immediately adjacent the groove being precisely removed such that the remaining portion of the thread will be substantially nondeformable under normal coupling assembly and use.

Although the preferred embodiment is described in terms of a threaded buttress collar, it should be recognized that the method of the present invention has utility with regard to any internally threaded member in which a seal ring groove is placed. Further, it should be further understood that the method of the present invention would yield identical benefits to those stated above regardless of the type of thread used in the member.

From the foregoing, it will be seen that this invention is one well adapted to attain all of the ends and objects hereinabove set forth, together with other advantages which are obvious and which are inherent to the device.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of manufacturing an improved modified threaded member comprising the steps of:
   a. machining a cylindrical blank to manufacture an internally threaded member with at least one threaded area that extends inwardly from one end face thereof;
   b. cutting a seal ring groove within the sealing threads of said threaded area of said internally threaded member whereby the thread forming the major portion of each sidewall of the seal ring groove is tapered to a feather edge;
   c. removing the feather edge of the thread immediately adjacent the wall of said seal ring groove furthest from said face of said internally threaded member.

2. A method for manufacturing an improved threaded member as recited in claim 1 wherein:
   the feather edge thread is removed to a point where the initial thead width of the remaining thread is at least 0.023 inches.

3. A method for manufacturing an improved internally threaded and grooved member comprising:
   a. setting a threading tool of a lathe a known initial distance from a face of a cylindrical member;
   b. threading an area of said cylindrical member internally with said threading tool;
   c. cutting an annular groove within the threaded area of said cylindrical member whereby tapered feather edges are formed on the threads forming a substantial portion of the walls of the anular groove;
   d. operating a machining tool of said lathe to remove the feather edge thread on the side of the groove furthest from the face of the member;
   e. determining the angular difference between the feather edge thread and the location of the cut made by said machining tool during said operating step;
   f. adjusting said known initial distance between said threading tool and the face of said cylindrical member to reduce the angular difference between the feather edge thread and the location of the cut made by said machining tool during said operating step to zero so that the location of the feather edge thread will be coincident with the location of the cut made by said machining tool during said operating step;
   g. repeating said setting, threading, cutting, operating and determining steps on other cylindrical members after said adjusting step thereby manufacturing an improved internally threaded and grooved member with the feather edge thread removed.

4. A method as recited in claim 2 wherein said removing step is comprised of:
   a. computer controlling a machining tool to effect a feather edge thread removal cut;
   b. determining the angular difference between the feather edge thread and the location of the feather edge removal cut made by said machining tool during said computer controlling step;
   c. adjusting the starting point of said machining step along the cylindrical axis of said cylindrical blank so that the angular difference between the feather edge thread and the location of the feather edge removal cut is zero thereby moving the location of the feather edge thread to the location where the feather edge thread removal cut is made on each cylindrical blank machined thereafter.

5. An improved threaded collar having a seal ring groove machined therein in a threaded portion thereof comprising:
   a. a threaded collar having threaded areas extending internally, inwardly from both faces thereof;
   b. a seal ring groove located within each of said threaded areas of said collar;
   c. a modified thread immediately adjacent each of said seal ring grooves on the side of said seal rings grooves furthest from the corresponding face such that the initial width of said modified thread is at least 0.023 inches.

6. An improved threaded collar having a seal ring groove therein wherein the feather edge thread immediately adjacent the seal ring groove has been removed by the method of claim 3.

7. A method as recited in claim 2 wherein:
   the initial thread adjacent said groove remaining after said removing step is completed is sloped from the depth of the root of the thread to full thread height.

8. A method as recited in claim 3 wherein:
   the initial thread adjacent said groove remaining after said removing step is completed is sloped from the depth of the root of the thread to full thread height.

9. A method of manufacturing an improved modified threaded member comprising the steps of:
   a. machining a cylindrical blank to manufacture a member with at least one internally threaded area extending inwardly from one face of said member;
   b. cutting a seal ring groove within the threaded area of said member thereby creating feather edge threads on each side of said seal ring groove;
   c. removing the feather edge thread on the side of said seal ring groove furthest from said face of said member.

* * * * *